(12) United States Patent
Lin

(10) Patent No.: US 7,940,617 B2
(45) Date of Patent: May 10, 2011

(54) METHOD FOR CALIBRATING A SPHERICAL ABERRATION COMPENSATION LEVEL IN AN OPTICAL DRIVE

(75) Inventor: Wei Chih Lin, Taipei (TW)

(73) Assignee: Lite-On It Corporation, Taipei (TW)

( * ) Notice: Subject to any disclaimer, the term of this patent is extended or adjusted under 35 U.S.C. 154(b) by 274 days.

(21) Appl. No.: 12/179,032

(22) Filed: Jul. 24, 2008

(65) Prior Publication Data
US 2009/0028013 A1    Jan. 29, 2009

(30) Foreign Application Priority Data
Jul. 24, 2007    (CN) .......................... 2007 1 0129725

(51) Int. Cl.
*G11B 5/09*    (2006.01)
(52) U.S. Cl. ................. 369/47.41; 369/44.27; 369/44.32
(58) Field of Classification Search ............... 369/44.26, 369/44.27, 44.28, 44.29, 44.32, 47.4, 47.41, 369/53.23, 53.28, 53.37, 94
See application file for complete search history.

(56) References Cited

U.S. PATENT DOCUMENTS

| | | | | |
|---|---|---|---|---|
| 5,202,875 A | * | 4/1993 | Rosen et al. | 369/94 |
| 5,917,791 A | * | 6/1999 | Tsuchiya et al. | 369/53.23 |
| 6,021,102 A | * | 2/2000 | Seto et al. | 369/53.23 |
| 7,190,642 B2 | * | 3/2007 | Ohkubo et al. | 369/44.11 |
| 7,200,087 B2 | * | 4/2007 | Choi | 369/53.23 |
| 7,307,933 B2 | * | 12/2007 | Fujiune et al. | 369/53.28 |

FOREIGN PATENT DOCUMENTS
WO    WO 2005/034100 A2 *    4/2005

* cited by examiner

*Primary Examiner* — Aristotelis Psitos
(74) *Attorney, Agent, or Firm* — WPAT, PC; Justin King

(57) ABSTRACT

A method for calibrating an SA compensation level of an optical drive is provided. The method includes steps of providing a plurality of SA compensation levels; obtaining a peak-to-peak value of an S curve corresponding to each of the SA compensation levels; selecting a maximum of the peak-to-peak values of the S curves and the SA compensation level corresponding to the maximum; and setting the selected SA compensation level to be an optimal SA compensation level.

4 Claims, 3 Drawing Sheets

METHOD FOR CALIBRATING A SPHERICAL ABERRATION COMPENSATION LEVEL IN AN OPTICAL DRIVE

This application claims the benefit of People's Republic of China application Serial No. 200710129725.0, filed Jul. 24, 2007, the subject matter of which is incorporated herein by reference.

BACKGROUND OF THE INVENTION

1. Field of the Invention

The invention relates in general to a method for calibrating a spherical aberration (SA) compensation level of an optical drive, and more particularly to a method for calibrating the SA compensation level based on a peak-to-peak value of an S curve.

2. Description of the Related Art

Referring to FIG. 1, a schematic diagram of a conventional optical pickup head for reading a compact disk (CD) and digital video disk (DVD) is shown. From FIG. 1, it can be seen that the optical pickup head is composed of a laser diode 11, beam splitter 12, wavelength selector 14 and a focus object lens 15. When the optical pickup head is to perform a focusing operation, a laser beam is generated by the laser diode 11 to pass through the beam splitter 12 and the wavelength selector 14, and is then focused by the focus object lens 15 on the optical disk 16.

After focusing on the optical disk 16, the laser beam is reflected from the optical disk 16 to pass the beam splitter 12 and then arrives a photo detector (not shown) to generate optical signals such as focus error (FE) signals, track error (TE) signals and radio frequency (RF) signals. The optical detector is a charge-coupled device (CCD) or a complementary metal oxide semiconductor (CMOS).

As shown in FIG. 1, in order to precisely focus the laser beam on a data layer of the optical disk 16, the focus object lens 15 is designed to be movable in a moving range F. That is, the focus object lens can be controlled to get close to or apart from the optical disk. It can be determined according to the focus error signal whether the laser beam is focused on the data layer of the optical disk or not. Normally, the control chip in the optical drive can provide the focus actuator with different focus offsets in order to control the focus object lens 15 to reach an arbitrary position in the moving range F.

Therefore, with regard to the conventional CD and DVD optical storage technique, good focus quality can be achieved by just adjusting the position of the focus object lens 15 owing to that the spherical aberration (SA) of the focus object lens has not much influence on the focusing operation.

However, in terms of the advanced optical storage technique in a high definition-capable DVD (HD-DVD) or a blue-ray disk (BD), the storage density is increased by shortening the wavelength of the laser beam or enlarging the numeric aperture (NA) of the focus object lens, but at the same time the SA effect of the focus object lens becomes large and cannot be neglected, thereby enhancing the difficulty in precisely focusing. The focusing operation cannot be precisely performed by only adjusting the position of the focus object lens, but requires a SA compensation device as an aid. That is, to obtain an optimal focal point, it needs the SA compensation device to cooperate with the focus object lens.

Referring to FIG. 2, a schematic diagram of the optical pickup head used in the advanced optical storage technique is shown. The optical pickup head is composed of the laser diode 11, the beam splitter 12, a collimating mirror (CM) 13, the wavelength selector 14 and the focus object lens 15. The collimating mirror 13 is a SA compensation device, which can be replaced by a liquid crystal plate (LCP) or diffracted optical element (DOE). Therefore, when the optical pickup head is to perform the focusing operation, the laser diode 11 generates a laser beam to pass through the beam splitter 12 and become a parallel beam via the collimating mirror 13. Then, the parallel beam passes the wavelength selector 14 and is focused by the focus object lens on the optical disk 16.

After focusing on the optical disk 16, the laser beam reflected from the optical disk passes the beam splitter 12 to arrive a photo detector (not shown) to generate optical signals including the focus error signals, track error signals and RF signals.

As shown in FIG. 2, the collimating mirror 13 has a moving range S and can move in the moving range S to achieve an effect of dynamical SA compensation. That is, the collimating mirror 13 can be controlled to change its position to achieve the dynamical SA compensation. Normally speaking, the control chip of the optical drive can provide different SA compensation levels to control the collimating mirror to reach an arbitrary position in the moving range S. Of course, the dynamic SA compensation can also be achieved by providing different SA compensation levels on the LCP or DOE.

The focusing operation can be performed under every SA compensation level, but the good reading and writing quality cannot be achieved due to the SA influence. Therefore, only under the optimal SA compensation level, the SA has the minimum influence on the focal point, and thus the optimal reading and writing quality can be provided.

For this reason, in order to obtain the optimal SA compensation level, the conventional method selects a number of SA compensation levels for the focusing and tracking operations, and monitors performance of the HF jitters or push-pull amplitudes to determine the optimal SA compensation level. However, in addition to the SA factor, the focus offset also influences the HF jitters and push-pull amplitudes. Therefore, the optimal SA compensation level determined by using only one control variable would not be precise.

Referring to FIG. 3, a curve diagram of functional relation between the SA compensation levels and HF jitters and functional relation between the SA compensation levels and push-pull amplitudes is shown. From the two curves, it can be seen that under the same system, when the SA compensation level is 800, although the HF jitter has a minimum value, the push-pull amplitude does not reach the maximum. That is, when the SA compensation level is 800, the data reading and writing quality is the best due to minimizing of the HF jitter, but the push-pull amplitude, which is not the maximum, will cause that the servo control system in the optical drive cannot be controlled easily. Comparatively, when the SA compensation level is 1500, although the maximum push-pull amplitude can be obtained, the HF jitter does not reach the minimum. That is, when the SA compensation level is 1500, the servo control system in the optical drive can be better controlled due to maximizing of the push-pull amplitude, but the HF jitter, which is not the minimum, will cause the reduction of data reading and writing quality. Both situations result from that the optimal SA compensation level cannot be obtained since the SA compensation level is set as the only control variable in the above two curves without considering the factor of focus offset. Furthermore, the monitoring and calculation of the HF jitters or push-pull amplitudes can be performed only after the optical drive completes the tracking operation, which wastes much more time in the calibration of SA compensation level.

Another conventional method of 2D calibration improves the above issue by using the two control variables of SA compensation level and focus offset. The method selects a number of SA compensation levels and focus offsets, and performs focusing and tracking operations corresponding to each matching condition of the SA compensation level and focus offset. In this way, the optimal SA compensation level can be obtained by monitoring the performance of the HF jitter or push-pull amplitude. Therefore, the calculation result can approach the real optimal SA compensation level to simultaneously achieve better data quality and servo control.

However, the 2D calibration method, similarly, cannot read and calculate the HF jitters or push-pull amplitudes unless the tracking operation has been performed. As a result, not only much more time should be wasted in inefficient seeking and tracking operations, but also tracking failure may occur due to optical-disk shaking or improper settings of SA compensation level or focus offset in the calibration process. Besides, although the calculated SA compensation level can be very close to the real SA compensation level, the 2D calibration method requires too complicated procedures and thus largely increases the amount of data to be processed.

SUMMARY OF THE INVENTION

The invention is directed to a method for calibrating an SA compensation level in an optical drive. The optimal SA compensation level can be obtained by simply determining a peak-to-peak value of an S curve without need of tracking.

According to the present invention, a method for calibrating an SA compensation level of an optical drive is provided. The method includes steps of providing a plurality of SA compensation levels; obtaining a peak-to-peak value of an S curve corresponding to each of the SA compensation levels; selecting a maximum of the peak-to-peak values of the S curves and the SA compensation level corresponding to the maximum; and setting the selected SA compensation level to be an optimal SA compensation level.

The invention will become apparent from the following detailed description of the preferred but non-limiting embodiments. The following description is made with reference to the accompanying drawings.

DETAILED DESCRIPTION OF THE INVENTION

When the optical disk is placed into the optical drive, the optical drive actuates a start up procedure including initializing system parameters, compensating signal offsets, determining a disk type and focusing a laser beam of the pickup head on the optical disk. The invention performs the SA-compensation-level calibration when the optical drive is determining the disk type without need of the complicated tracking procedures.

Normally, during the start up procedure of the optical drive under an open-loop control, the focus object lens is controlled to move away from the optical disk by the focus actuator, then move toward the optical disk such that the focal point passes one data layer of the optical disk. This operation makes the focus error signal (FE) outputted by the photo detector to generate an S curve. Reasoning by analog, when the focal point is controlled to pass two data layers of a double-layer optical disk, the focus error signal (FE) outputted by the photo detector generates two S curves. That is, during the open-loop control, the number of the data layers in the optical disk can be determined based on the number of the S curves generated by the focus error signal (FE), and the type of the optical disk, such as CD or DVD, can be determined based on the position of the S curve.

Figure 1:
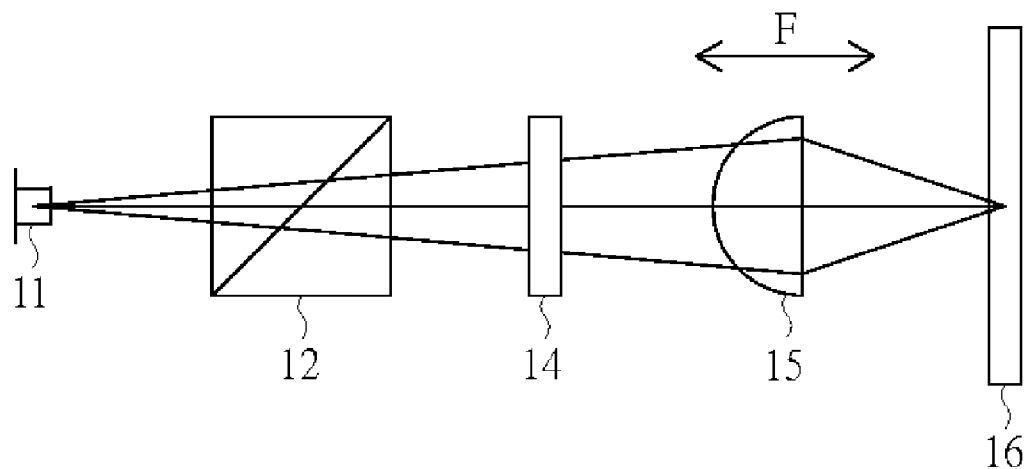
FIG. 1 (Prior Art) is a schematic diagram of a conventional optical pickup head for reading a CD and DVD.
Figure 2:
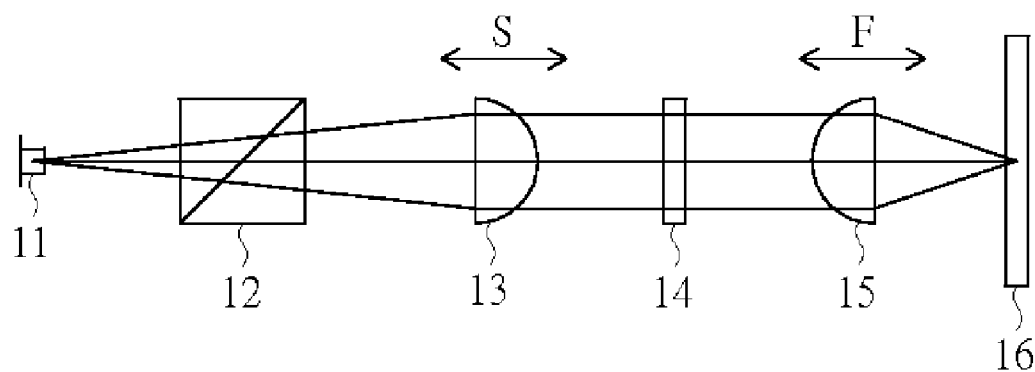
FIG. 2 (Prior Art) is a schematic diagram of the optical pickup head used in the advanced optical storage technique.
Figure 3:
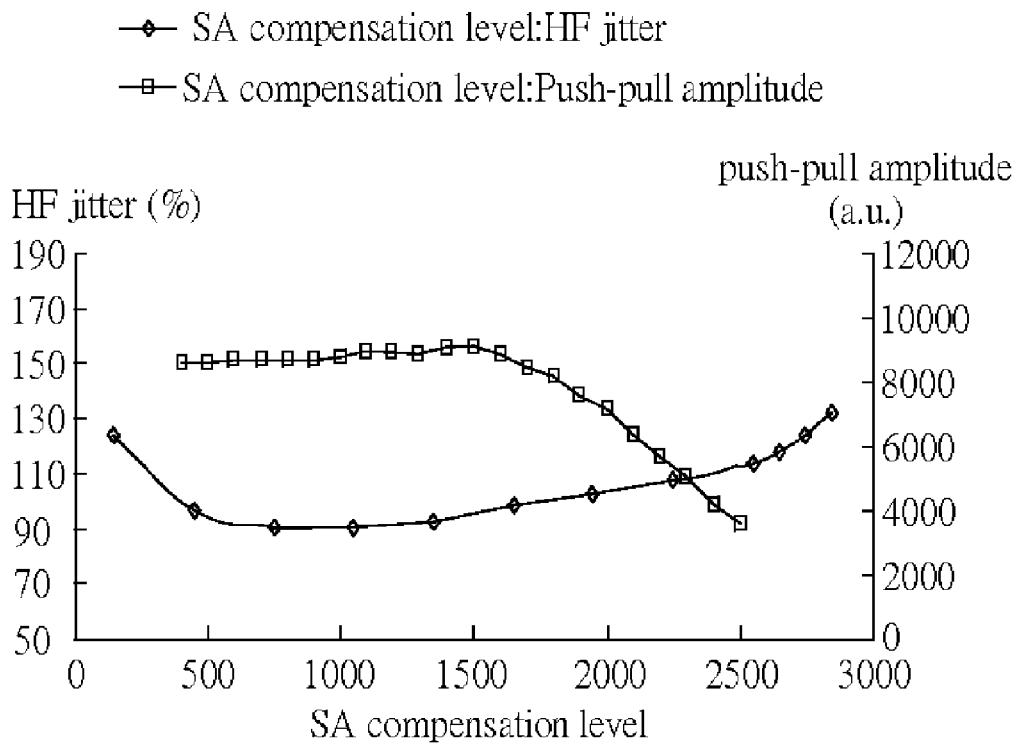
FIG. 3 (Prior Art) is a curve diagram of functional relation between the SA compensation levels and HF jitters and functional relation between the SA compensation levels and push-pull amplitudes.
Figure 4:
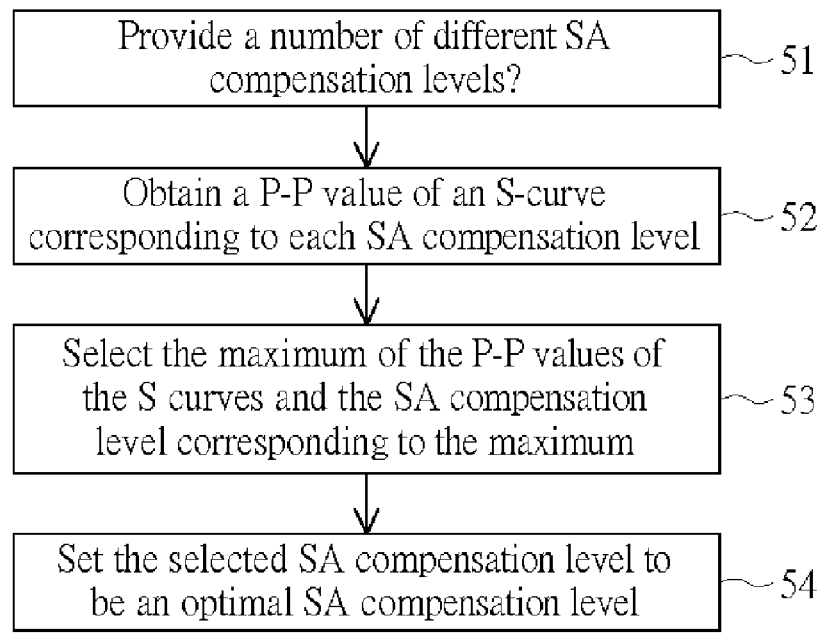
FIG. 4 is a flow chart of the method for calibrating an SA compensation level according to the invention.

Therefore, the invention calibrates the SA compensation level by using the above features. Referring to FIG. 4, a flow chart of the method for calibrating an SA compensation level according to the invention is shown. In the process, the optical drive provides a number of different SA compensation levels (step 51), performs a circuit operation, and determines the number of circuit operations based on the different SA compensation levels. In other words, each circuit operation corresponds to one SA compensation level. The optical drive obtains different SA compensation levels by changing a state of the SA compensation device.

In the circuit operation, in order to obtain the S curve from the focus error signal under a selected SA compensation level, the optical drive drives the focus actuator via an open-loop control. First, the focus object lens is moved away from the optical disk by the focus actuator. Next, the focus object lens is moved toward the optical disk such that the focal point passes the data layer of the optical disk. Then, a peak-to-peak (P-P) value of the S curve generated by the focus error signal is obtained by the photo detector. Following that, the P-P value of the S curve and the corresponding SA compensation level are recorded (step 52). That is, in the step 52, the optical drive controls the focus actuator to generate a number of S curves based on the different SA compensation levels and records the P-P value of the S curve corresponding to each SA compensation level.

After the circuit operation has been completed and a number of P-P values of S curves have been obtained, the maximum of the P-P values and the SA compensation level corresponding to the maximum are selected (step 53). Finally, the selected SA compensation level is set to be the optimal SA compensation level (step 54).

Figure 5:
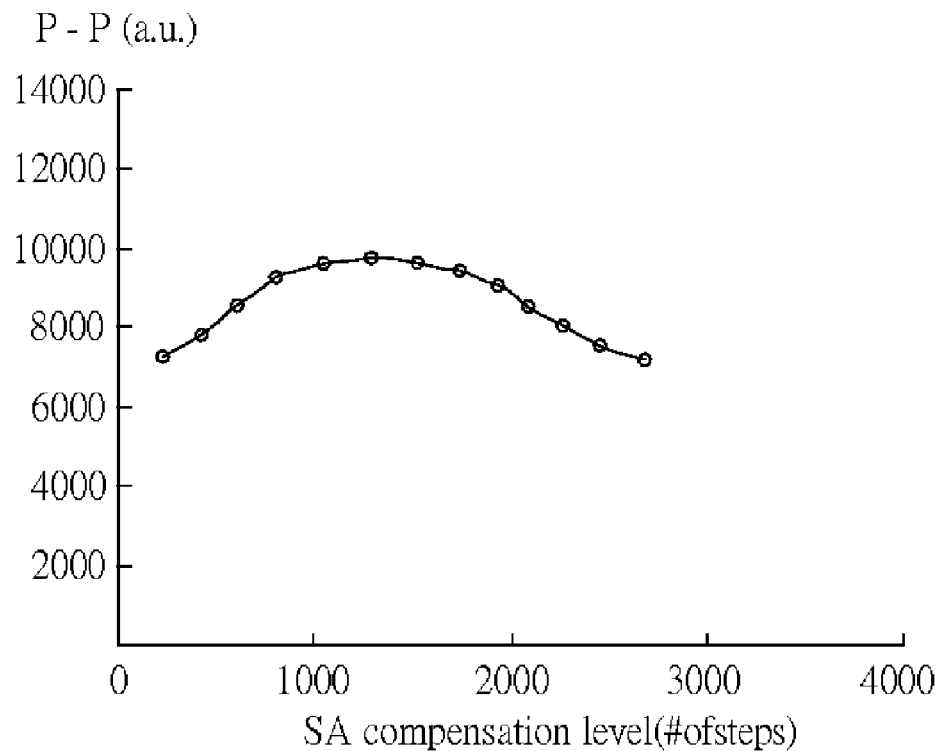
FIG. 5 is a schematic diagram of the P-P values of S curves under different SA compensation levels.

Referring to FIG. 5, a schematic diagram of the P-P values of S curves under different SA compensation levels is shown. From FIG. 5, it can be seen that the P-P values of S curves vary along with the different SA compensation levels. The maximum S-curve P-P value occurs when the SA compensation level is 1300. Thus, the invention uses the SA compensation level corresponding to the maximum P-P value of S curve to be the optimal SA compensation level. That is, the invention determines the optimal SA compensation level based on the P-P value of the S curve.

Figure 6:
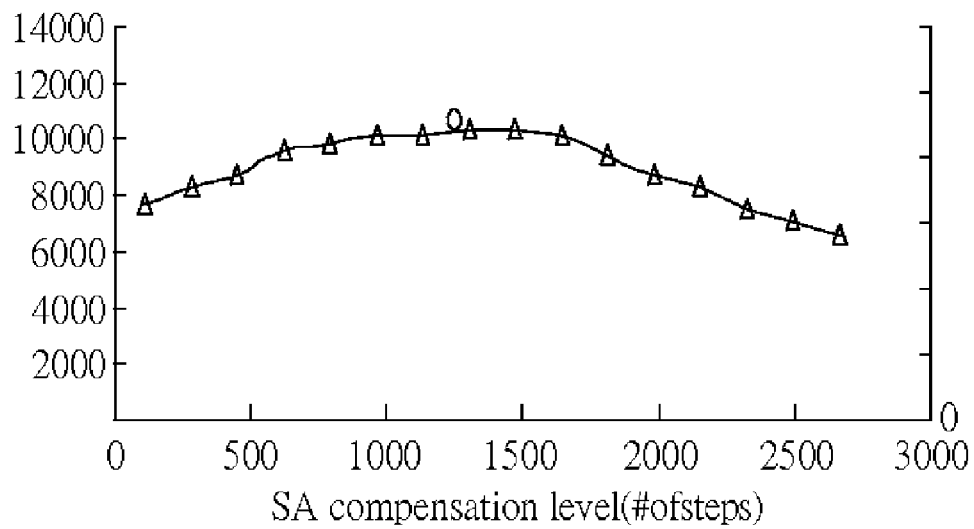
FIG. 6 is a comparison diagram between the method of the invention and the 2D calibration method.

Referring to FIG. 6, a comparison diagram between the method of the invention and the 2D calibration method is shown. Under the same system, the optimal SA compensation level obtained by the method of the invention is near 1300, similar to that obtained by the 2D calibration method. That is, the invention can obtain the optimal SA compensation level similar to that of the 2D calibration method, but requires no tracking operation before determining the HF jitter or push-pull amplitude and other complicated procedures in the 2D calibration method. The invention can simultaneously calibrate the SA compensation level in the step of determining the disk type during the start up procedure without need of tracking. Therefore, the invention simplifies the procedures, saves much time of seeking and tracking and is free from tracking failure due to the disk shaking, thereby increasing the speed and reliability in operation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for calibrating a spherical aberration (SA) compensation level of an optical drive, comprising steps of:
    (a) providing a plurality of SA compensation levels;
    (b) obtaining a peak-to-peak value of an S curve of a focus error signal corresponding to each of the SA compensation levels;
    (c) selecting a maximum of the peak-to-peak values of the S curves and the SA compensation level corresponding to the maximum; and
    (d) setting the selected SA compensation level to be an optimal SA compensation level.

2. The method according to claim 1, wherein the steps are performed in a start up procedure of the optical drive.

3. The method according to claim 2, wherein the start up procedure comprises initializing system parameters, compensating signal offsets, determining a type of an optical disk, and focusing a laser beam of an optical pickup head on the optical disk.

4. The method according to claim 1, wherein a focus actuator is used to control a position of a focus object lens and an open-loop control is performed such that an optical detector can obtain the S curve.

* * * * *